(12) United States Patent
Royer

(10) Patent No.: US 6,805,395 B2
(45) Date of Patent: Oct. 19, 2004

(54) TARPAULIN ROD SECURING DEVICE

(76) Inventor: Réal Royer, 15, boul. Industriel, CP 1177, Ville-Marie, QC (CA), J0Z 3W0

( * ) Notice: Subject to any disclaimer, the term of this patent is extended or adjusted under 35 U.S.C. 154(b) by 0 days.

(21) Appl. No.: 10/439,950

(22) Filed: May 16, 2003

(65) Prior Publication Data

US 2004/0000798 A1 Jan. 1, 2004

Related U.S. Application Data

(63) Continuation-in-part of application No. 10/217,629, filed on Aug. 12, 2002, now Pat. No. 6,595,594, which is a continuation-in-part of application No. 09/878,368, filed on Jun. 12, 2001, now abandoned.

(51) Int. Cl.[7] .............................................. B60J 11/00
(52) U.S. Cl. .............. 296/98; 296/100.16; 296/100.15; 24/714
(58) Field of Search ............................. 296/98, 100.16, 296/100.15, 100.18, 100.12, 100.11, 100.14, 100.01, 100.1; 24/714; 52/3; 135/119; 410/35, 97; 101/127.1

(56) References Cited

U.S. PATENT DOCUMENTS

| | | | | |
|---|---|---|---|---|
| 3,889,321 A | * | 6/1975 | Moser ........................ 24/714 |
| 4,027,360 A | * | 6/1977 | Moser ........................ 24/714 |
| 4,279,064 A | * | 7/1981 | Simme ................... 296/100.16 |
| 4,369,009 A | * | 1/1983 | Fulford ........................ 410/35 |
| 4,380,350 A | * | 4/1983 | Block ........................... 296/98 |
| RE31,746 E | * | 11/1984 | Dimmer et al. ............... 296/98 |
| 4,484,777 A | * | 11/1984 | Michel ......................... 296/98 |
| 4,518,193 A | * | 5/1985 | Heider et al. ................. 296/98 |
| 4,657,062 A | * | 4/1987 | Tuerk .......................... 296/98 |
| 5,180,203 A | * | 1/1993 | Goudy ......................... 296/98 |
| 5,211,440 A | * | 5/1993 | Cramaro ....................... 296/98 |
| 5,540,475 A | * | 7/1996 | Kersting et al. ........ 296/100.16 |
| 5,542,734 A | * | 8/1996 | Burchett et al. ......... 296/100.1 |
| 5,697,663 A | * | 12/1997 | Chenowth .................... 296/98 |
| 5,794,528 A | * | 8/1998 | Gronig et al. ........... 101/127.1 |
| 5,984,379 A | * | 11/1999 | Michel et al. .......... 296/100.16 |
| 6,193,299 B1 | * | 2/2001 | Than ...................... 296/100.15 |
| 6,478,361 B1 | * | 11/2002 | Wood ........................... 296/98 |
| 2002/0109371 A1 | * | 8/2002 | Wheatley ................ 296/100.16 |
| 2003/0190209 A1 | * | 10/2003 | Smith ........................... 410/97 |

\* cited by examiner

Primary Examiner—Kiran Patel
(74) Attorney, Agent, or Firm—Eric Fincham

(57) ABSTRACT

A tarpaulin rod securing device for use with a vehicle having an open area covered by a tarpaulin, the device comprising a first member having a recess formed therein with an access opening to the recess, and a second movable member which is movable between first and second positions, the second movable member permitting a rod to enter the recess while preventing withdrawal thereof.

9 Claims, 5 Drawing Sheets

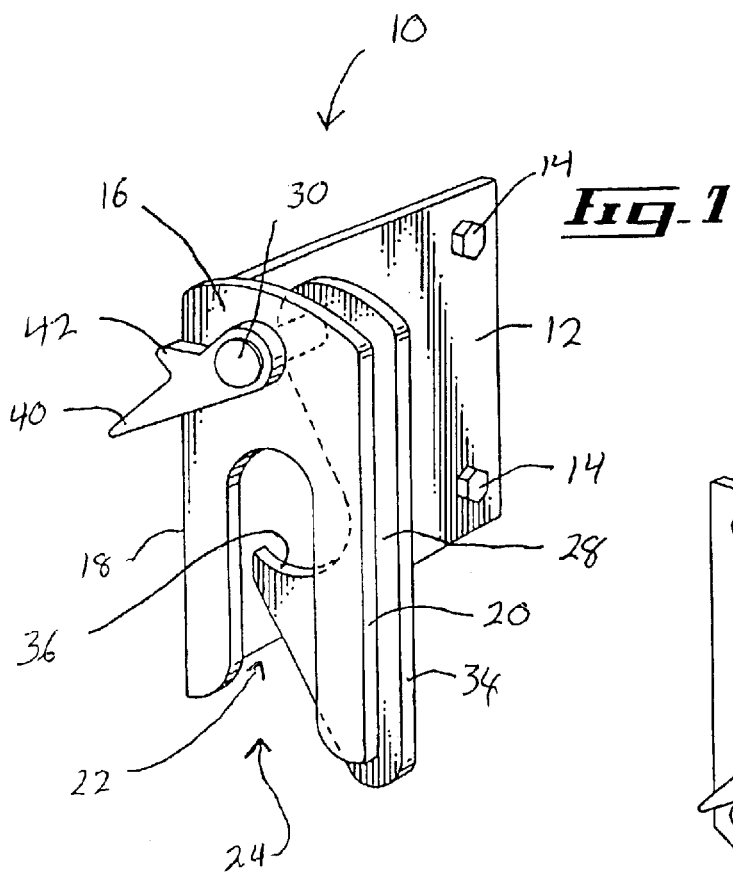
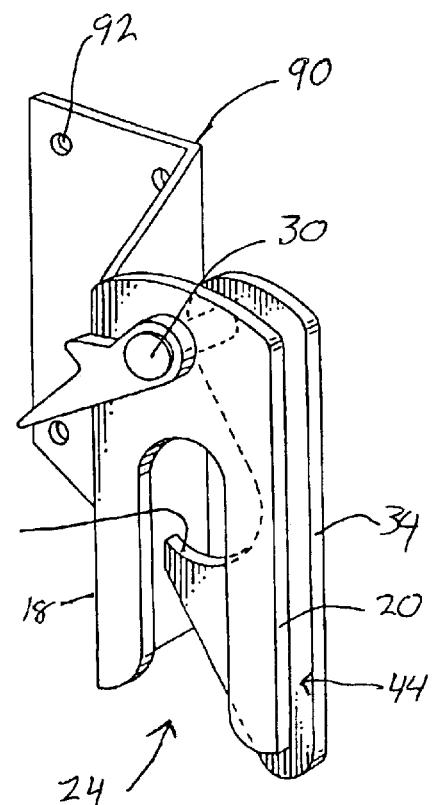
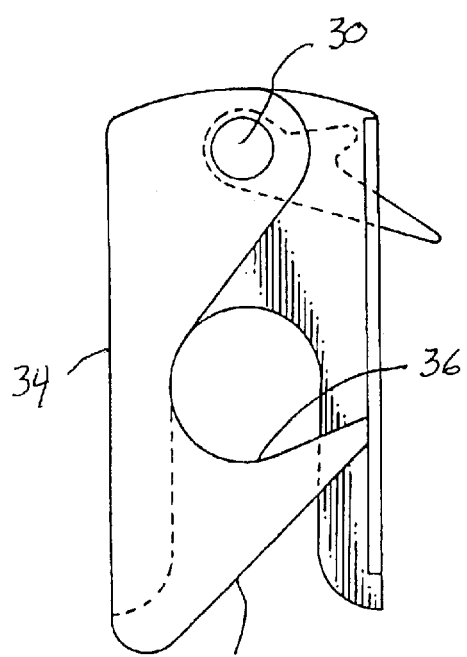

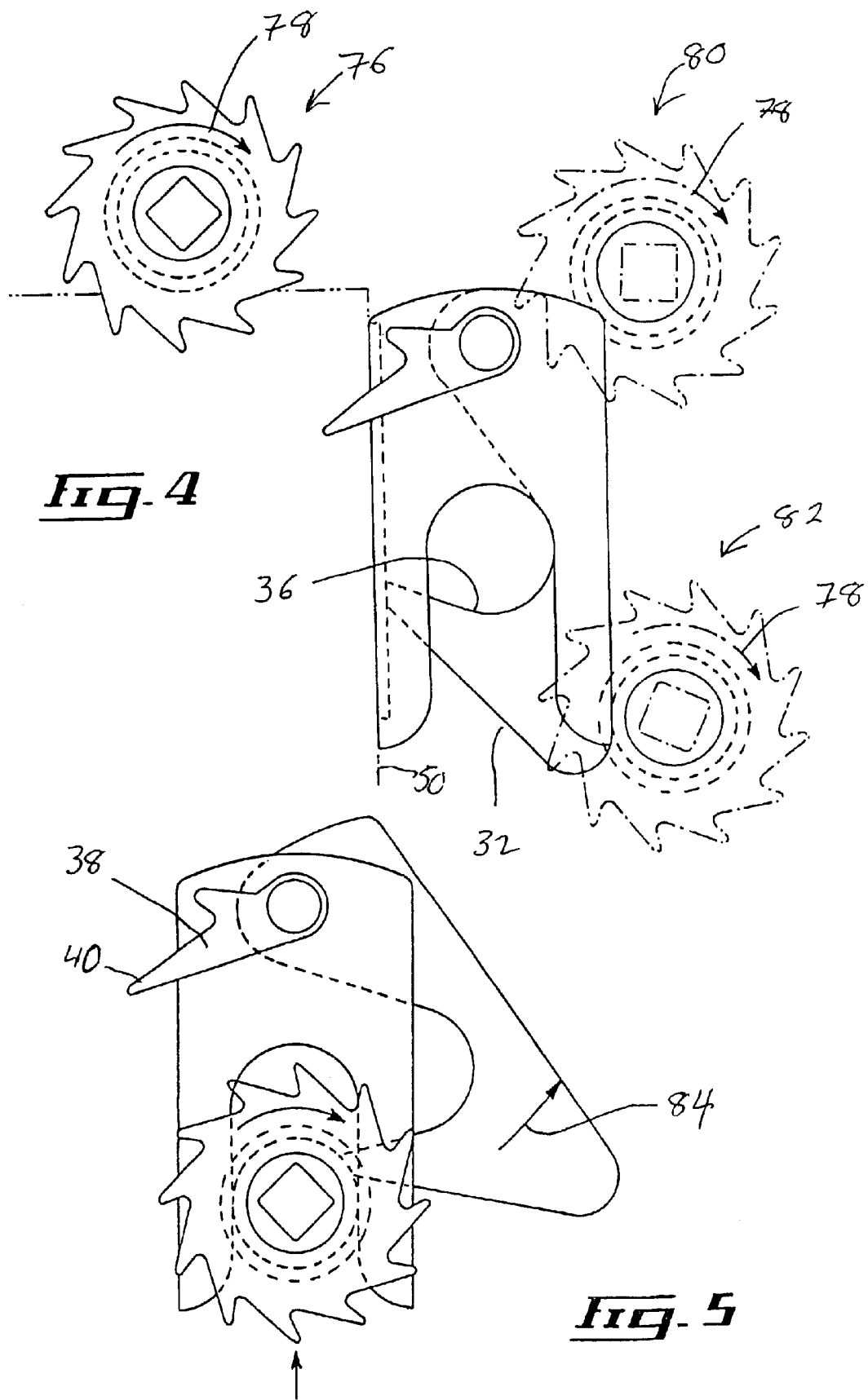

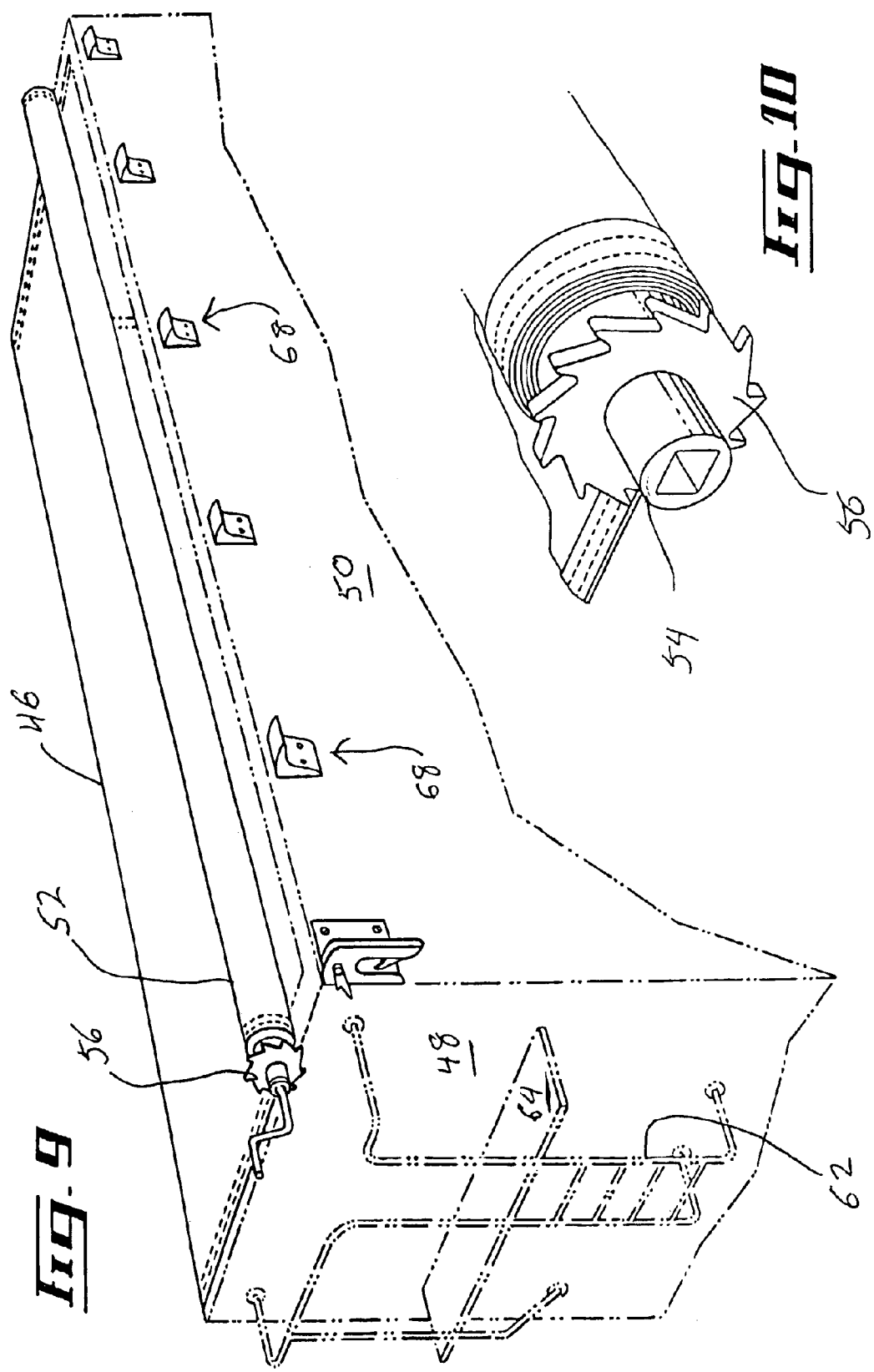

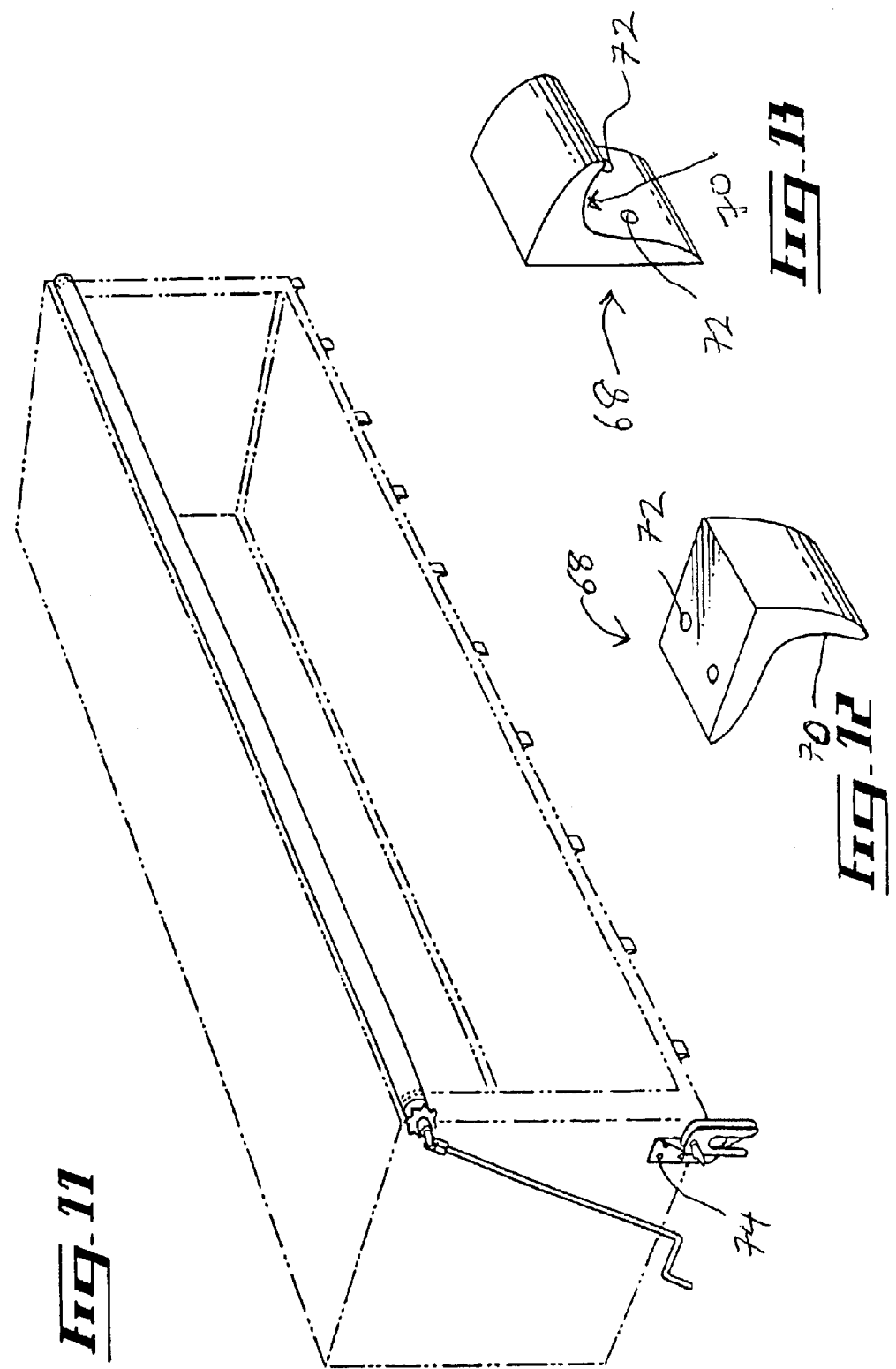

TARPAULIN ROD SECURING DEVICE

The present application is a continuation-in-part of application Ser. No. 10/217,629 filed Aug. 12, 2002 now U.S. Pat. No. 6,595,594 which is a continuation-in-part of application Ser. No. 09/878,368 filed Jun. 12, 2001 now abandoned.

FIELD OF THE INVENTION

The present invention relates to an improvement in a tarpaulin covering system and more particularly, relates to a tarpaulin rod securing device.

BACKGROUND OF THE INVENTION

The use of tarpaulins for covering an open box-like container such as a truck box or a storage bin is well known in the art. Thus, as shown in U.S. Pat. No. 4,484,777, there is provided a truck box having parallel side walls joined by transverse front and back end walls, with a flexible fabric cover fixed at one lateral edge to one side wall, and attached at the opposite lateral edge to a roll tube or rod which is rotatable from side to side along the top surfaces of the front and back end walls of the truck box to permit winding and unwinding of the fabric from the rod or tube to thereby permit covering and uncovering of the box structure. The tarpaulin rod is operated manually by a handle structure connected to the roll tube by a universal joint.

There is also known in the art to use automated means for winding and unwinding the rod and associated tarpaulin. Thus, there is shown in U.S. Pat. No. 4,673,208 a hydraulic system for moving a tarpaulin from one side to the other. It is also known from various patents to utilize an electric motor for the same purpose.

The tarpaulins are used to cover either the open top of a container or alternatively, may be utilized to cover a side wall.

Typically, when used to cover an open top container, the tarpaulin is there to prevent any portion of the load being blown from the open top of the container which can not only cause unnecessary wastage of the transported goods, but can also create dangerous situations. Thus, the danger of loose material being blown out of the container can cause pollution of the surrounding area and also create potentially dangerous situations for vehicles following the container. Accordingly, certain jurisdictions have imposed regulations requiring the use of tarpaulins.

Various configurations of tarpaulins have been proposed. However, two configurations have proven to be particularly popular. One such configuration is the so called end-rolled tarpaulin which is gathered at one of the longitudinal ends of the container when not in use and moved along the body of the container between operative and stored positions. The end-rolled tarpaulins are typically gathered at the front end of the vehicle and are usually provided along their length with a number of transverse supporting bars which extend between the two longer side walls of the container. The end-rolled tarpaulins are typically moved by means of a pair of cables trained over pulleys and carrying the tarpaulins with them as they move.

The other type of permanently installed tarpaulin preferred by some hauliers is referred to as the side-rolled tarpaulin. These so called side-rolled tarpaulins which permanently extends the full length of the container body are rolled and unrolled about a roll rod that also extends the full length of the container body.

The use of prior art flexible closures such as prior art tarpaulins to close or cover the loading aperture of open top containers is associated with a number of drawbacks. One major shortcoming related to prior art assembles involves the difficulty often encountered in drawing the flexible closures into a proper extended or closed configuration. Indeed, the relatively heavy, bulky and flexible nature of large tarpaulins often cause such closures to be quite difficult to draw into properly extended or closed position for service as cover.

Another main drawback associated with prior art assemblies relates to the difficulty in keeping the tarpaulin taut during the rolling and unrolling operations which leads to potential damage to the involved structures. This situation also leads to difficulties in establishing a suitable weather resistant seals about the perimeters of properly extended closures. The difficulty in keeping proper tension on the tarpaulin during rolling and unrolling operations is compounded in certain situations as for example when there exists a relatively moderate or high wind causing the tarpaulin to catch in the wind. In such instances, it is sometimes necessary to face the truck trailer in such a manner that the wind will not catch the tarpaulin. This may prove to be impossible when the wind changes direction. The difficulty in maintaining the tarpaulin in a taut state during rolling and unrolling operations leads to possible ripping or tearing of the tarpaulin and associated structures.

The difficulty in maintaining the tarpaulin in a taut state during rolling and unrolling operations also potentially leads to an improper seal which, in turn, may lead to potentially dangerous road condition and loss of material. This problem has been addressed by some of the prior art structures. However, most prior art structures or assemblies lack an effective means of maintaining the cover taut and in place during transportation especially at highway speeds. Indeed, the investment of time and effort that typically must be extended to properly secure a prior art tarpaulin to prevent its being drawn out of proper position by environmental conditions often proves to be unwieldy. Some prior art assemblies make use of a series of straps spaced along the tarpaulin which are secured to the container side wall by tying or clamping. These prior art assemblies have proven to be unsatisfactory since they have demonstrated a tendency to admit dust or rain under the tarpaulin and to allow the bulk material to flow between the peripheral edges of the tarpaulin and of the container. Also, at highway speeds, the tarpaulin is subject to billowing.

SUMMARY OF THE INVENTION

It is therefore an object of the present invention to provide a means for maintaining or securing the tarpaulin rod or tube in place after the tarpaulin has been unwound therefrom.

According to one embodiment of the present invention, there is provided, in a vehicle having an open area covered by a tarpaulin, and wherein the tarpaulin is moved from an uncovering position to a covering position by means of a longitudinal rotating tarpaulin rod, the improvement comprising a tarpaulin rod securing device, the tarpaulin rod securing device comprising a first member having a recess formed therein, an access opening to the recess, the recess being sized to receive the tarpaulin rod, and a second movable member, the second movable member being movable between a first position wherein the tarpaulin rod may have access to the recess, and a second position wherein the movable member secures the tarpaulin rod within the recess.

According to a further embodiment of the present invention, there is provided a tarpaulin rod securing device comprising a first member having a recess formed therein, an access opening to the recess, and a second movable member pivotably connected to the first member and being spaced therefrom to provide a gap therebetween, the second movable member being movable between a first position wherein the second movable member permits access to the recess, a second position wherein the movable member prevents access from the recess.

The tarpaulin rod securing device of the present invention may be utilized in several different configurations including one wherein the tarpaulin extends over an open top container and also in the so-called side-rolled tarpaulins.

As aforementioned, there is provided a first member which has a recess and an access opening to the recess. The recess is preferably of a U-shaped configuration although it is within the scope of the invention to use different configurations.

The movable member is mounted such that it may be moved between first and second positions. Preferably, the second member is pivotably connected and is provided with an angled bottom surface such that in a normal position, it will prevent a member from exiting the recess while permitting entry thereto.

BRIEF DESCRIPTION OF THE DRAWINGS

Having thus generally described the invention, reference will be made to the accompanying drawings illustrating an embodiment thereof, in which:

FIG. 1 is a perspective view of a tarpaulin rod securing device according to one embodiment of the present invention;

FIG. 2 is a perspective view of a slightly modified version thereof for use on a different type of tarpaulin arrangement;

FIG. 3 is a side elevational view of the tarpaulin rod retaining device from FIG. 1;

FIGS. 4 and 5 are end views illustrating the use and operation of the securing device;

FIG. 9 is a perspective view of a portion of a trailer incorporating the tarpaulin rod securing device of the present invention;

FIG. 10 is a perspective view of the end of the tarpaulin and rod;

FIG. 11 is a perspective view of a portion of a semi-trailer having a side wall covered by a tarpaulin and incorporating the tarpaulin rod securing device of FIG. 2;

FIG. 12 is a perspective view of a retaining device utilized in the embodiment of FIG. 11; and FIG. 13 is a perspective view of the retaining device as used in the embodiment of FIG. 9.

DESCRIPTION OF THE PREFERRED EMBODIMENTS

Figure 6:
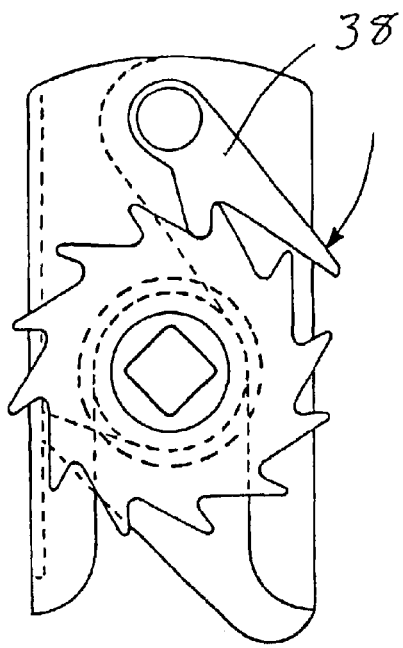
FIG. 6 is an end view illustrating the tarpaulin rod being in a locked position.
Figure 7:
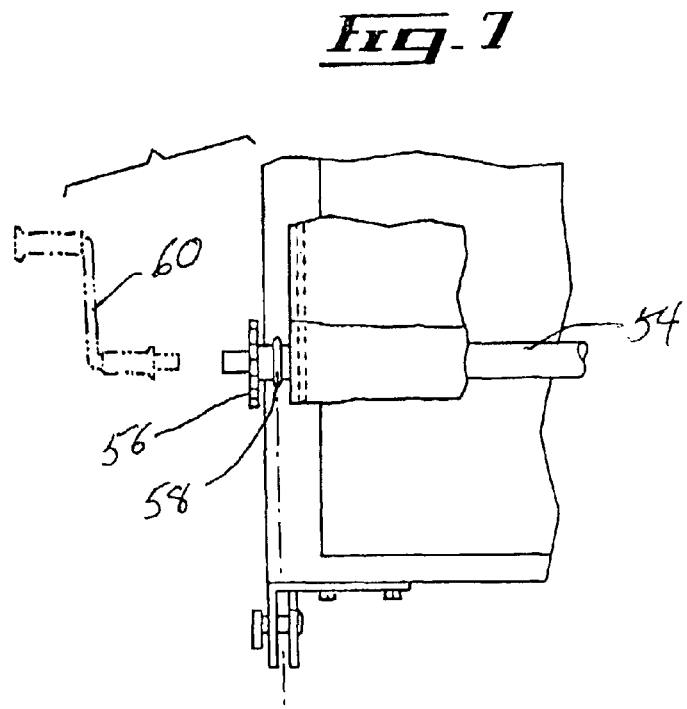
FIG. 7 is a top plan view of a portion of the tarpaulin, rod and locking device as the tarpaulin is being unrolled.

Referring initially to FIG. 1, there is illustrated one embodiment of a tarpaulin rod securing device and which device is generally designated by reference numeral 10.

Tarpaulin rod securing device 10 includes a bracket 12 in the form of a plate and which is designed to receive bolts 14 for securement to a trailer as will be shown and discussed hereinbelow.

Device 10 includes a first member 16 having a first side wall 18 and a second side wall 20. Defined between first side wall 18 and second side wall 20 is an inverted U-shaped recess 22 having an entry 24 thereto at the bottom portion of first member 16.

A movable member 28 is secured to first member 16 by means of a pivot pin 30. Movable member 28 is secured near upper wall 26 and is provided with a tapered or bevelled end wall 32 for reasons which will become apparent hereinbelow. Movable member 28 also includes an outer side wall 34 and an inner side wall 36 which has an arcuate semi-circular configuration.

Mounted on pivot pin 30 exteriorly of first member 16 is a locking pawl having a tapered end 40 and a spur 42 extending from a side wall thereof.

It will be noted that there is provided a gap or space generally designated by reference numeral 44 between first member 16 and movable member 28 for reasons which will be discussed hereinbelow.

As seen in FIG. 9, a trailer 46 outlined in dotted lines includes an end wall 48 and a side wall 50. Trailer 46 will have an open top which is designed to be covered with a tarpaulin 52. Tarpaulin 52 is mounted on a rolling pole or rod 54. Rod 54 includes a sprocket wheel 56 at one end thereof while a guide ring 58 is also formed on rod 54. A handle assembly 60 may be utilized for rolling and unrolling the tarpaulin 52 and to gain access thereto, trailer 46 may be provided with a ladder 62 and a platform 64.

In operation, and as may be best seen in FIGS. 4 to 8, reference numeral 76 in FIG. 4 illustrates a first position of the rod as it is turning in the direction indicated by arrow 78 and it nears the side wall of the trailer. Continued movement along to the position indicated by reference numeral 80 is continued and the rod passes the side wall 20 of first member 16 and outer side wall 34 of movable member 28 and descends downwardly therealong as indicated by the position designated by reference numeral 82 in FIG. 4.

As the rod passes underneath of tarpaulin rod securing device 10, tension will place an upper force on tapered end wall 32 forcing it outwardly as indicated by arrow 84. Once the rod has completely entered U-shaped recess 22, movable member 28 will pivot back into position to thereby secure rod 54 in position. As an additional locking feature, pawl 38 may then be pivoted as indicated by arrow 86 (FIG. 6) such that spur 42 will engage sprocket wheel 56 to prevent further movement thereof.

Figure 8:
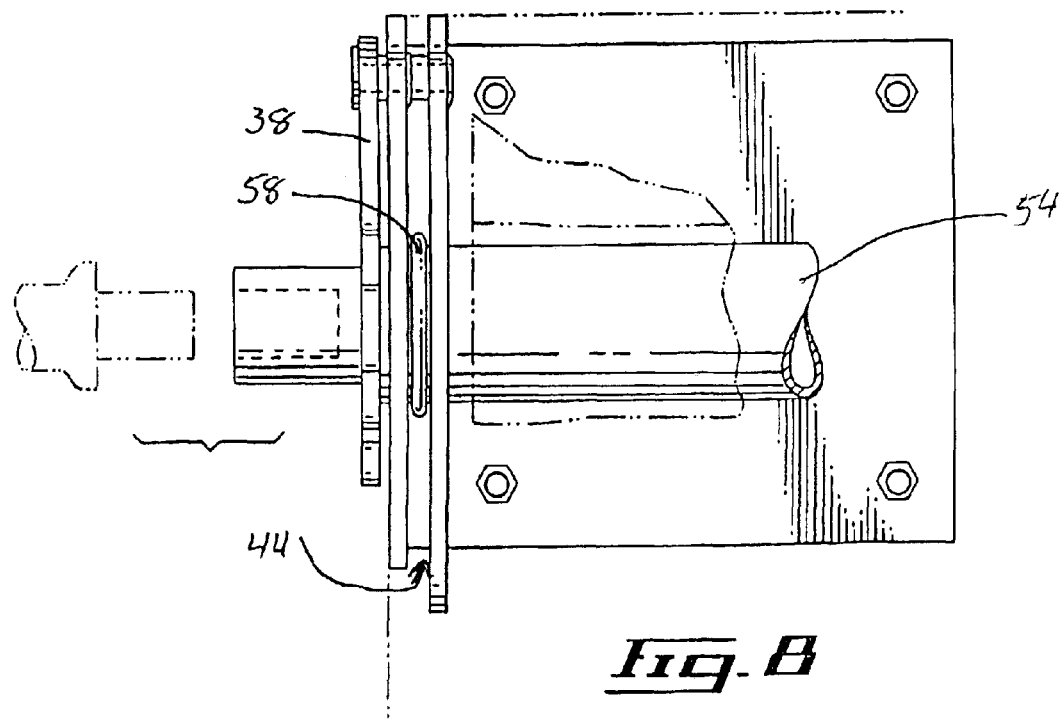
FIG. 8 is a front elevational view of a portion of a securing device while the tarpaulin is being unrolled.

As may be seen in FIG. 8, guide ring 58 is sized to fit within the gap 44 between first member 16 and movable member 28 such that during the latter portion of its movement, rod 54 is retained securely in position.

To further secure and support the rod 54, a plurality of retaining devices 68 are provided. Each of retaining devices 68 has a plurality of apertures 72 to receive a fastening device 74 for securement to the side wall 50 of trailer 46. It will be noted they have a concave surface 70 to assist in retaining the rod 54 in position.

A slightly different version is illustrated in FIGS. 2, 11 and 12. In this arrangement and referring to FIG. 11, the trailer has an open side wall and therefore, the tarpaulin rod securing device has a slightly different bracket. As shown in FIG. 2, there is provided an L-shaped bracket 90 with apertures 92 therein for receiving a fastening device 74. Bracket 90 is fastened as shown in FIG. 11 at the bottom of end wall 48. The operation is substantially the same as with respect to the previously described embodiment.

It will be understood that the above described embodiments are for purposes of illustration only and that changes and modifications may be made thereto without departing from the spirit and scope of the invention.

I claim:

1. In a vehicle having an open area defined by at least a wall, the open area being covered by a tarpaulin, and wherein the tarpaulin is moved from an uncovering position to a covering position by means of a longitudinal rotating tarpaulin rod, the improvement comprising a tarpaulin rod securing device, said tarpaulin rod securing device comprising:

a first member having a recess formed therein, said member being secured to a wall of said vehicle, an access opening to said recess, said recess being sized to receive said tarpaulin rod said access opening facing downwardly; and a second movable member, said second movable member being movable between a first position wherein said tarpaulin rod may have access to said recess, and a second position wherein said movable member secures said tarpaulin rod within said recess.

2. The device of claim 1 wherein said recess comprises a U-shaped recess.

3. The device of claim 2 wherein said second movable member is pivotably connected to said first member.

4. The device of claim 3 wherein said second movable member has a tapered end wall such that when pressure is exerted thereon, said pressure will cause said second movable member to pivot outwardly to permit access to said U-shaped recess.

5. The device of claim 3 further including a locking pawl, said locking pawl being arranged to be movable to a position to engage a sprocket wheel on said tarpaulin rod.

6. The device of claim 4 wherein said first member and said second movable member are spaced apart to provide a slot therebetween, said slot being sized to receive a guide ring on said tarpaulin rod.

7. The device of claim 6 further including a mounting plate attached to said first member.

8. The device of claim 6 wherein said vehicle has an open top, said tarpaulin rod securing device being secured to an upper side wail of said vehicle proximate one end thereof.

9. The device of claim 8 further including a plurality of retaining devices secured to said side wall of said vehicle, each of said retaining devices having a downwardly facing concave surface to receive and retain said tarpaulin rod.

* * * * *